United States Patent [19]

Busbey

[11] 4,310,418
[45] Jan. 12, 1982

[54] COOKWARE WITH DRAINAGE LID
[76] Inventor: Sylvia S. Busbey, 416 Crescent Dr., Mattoon, Ill. 61938
[21] Appl. No.: 158,921
[22] Filed: Jun. 12, 1980
[51] Int. Cl.³ ............................................. B01D 23/20
[52] U.S. Cl. .................................................... 210/467
[58] Field of Search ................................. 210/466, 467

[56] References Cited
U.S. PATENT DOCUMENTS

| | | | |
|---|---|---|---|
| 254,500 | 3/1882 | Obermann | 210/467 X |
| 630,414 | 8/1899 | Schwartz | 210/467 X |
| 2,083,017 | 6/1937 | Hayes | 210/466 X |

Primary Examiner—Thomas G. Wyse
Attorney, Agent, or Firm—Harvey B. Jacobson

[57] ABSTRACT

A pot having a pour spout is provided with a lid containing a depending annular flange which fits within the pot against the inside surface of the pot. The flange contains a solid portion which extends for a distance sufficient to cover the spout opening in the pot and also includes one or more areas having various size slots or holes formed therein. In this manner, the lid can be turned on the pot for selectively closing off the drainage spout or disposing one set of slots or holes across the spout to act as a sieve for draining liquid from the pot.

1 Claim, 5 Drawing Figures

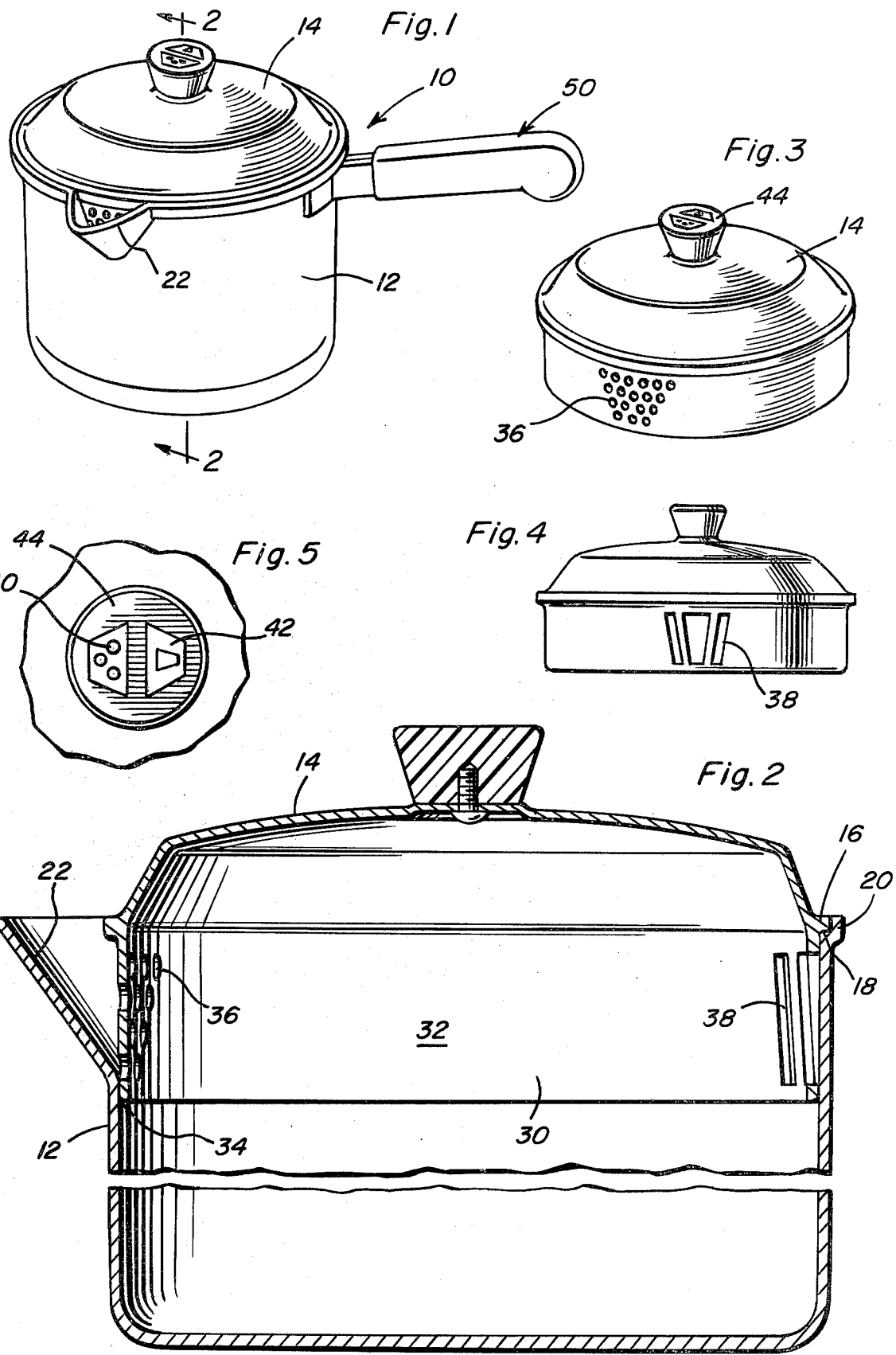

COOKWARE WITH DRAINAGE LID

BACKGROUND OF THE INVENTION

1. Field of the Invention

This invention relates to cookware which is adapted to allow drainage of liquids from foods cooked within the cookware.

2. Discussion of Related Art

In food preparation it is customary to cook foods, such as vegetables, in a liquid base in order to insure thorough and proper preparation of the food. In order to insure that the liquid base will not evaporate during the cooking time, a fairly tight lid is normally placed on the cooking vessel to completely enclose the interior thereof. When the alloted cooking time for the particular food has elapsed, the normal procedure is for the liquid to be drained from the cooked food by use of a colander or similar sieve device.

Cook pans have been suggested which provide unique tops for either partially venting the interior of the vessel or facilitating the drainage of fluid therefrom. For instance, U.S. Pat. No. Re. 21,688, issued Jan. 7, 1941, to Van Ness, demonstrates a utensil which can be used as a cover or top for a pot. The utensil comprises a plate which is ordinarily circular in form and projecting downward from the undersurface of the utensil is a circular flange which is solid except for a number of perforations formed at one point therein. When the utensil is used as a cover, it can be tilted upwardly so that the perforations are exposed and can act as a sieve. U.S. Pat. No. 2,907,467, issued Oct. 6, 1959, to Machate, discloses a cover comprising a concavo convex element in the form of a segment of a sphere for engaging the upper rim of utensils. The cover includes apertures formed adjacent the edge of the cover which apertures can be selectively disposed over the utensil for venting and drainage of the liquid contents of the utensil or can be moved away from the edge of the utensil to completely enclose the interior thereof. U.S. Pat. No. 2,185,897, issued Jan. 2, 1940, to Krause et al, discloses a sauce pan and lid wherein the lid has a rim flange for engagement with the pan which is provided with a series of apertures which are registrable with similar size apertures formed in the pan. The top can be rotated on the pan so as to provide variable venting to the pan interior and also provide a means whereby the liquid in the pan can be drained.

SUMMARY OF THE INVENTION

One object of the present invention is to provide a cookware utensil having a lid which fits securely and tightly on the utensil thereby facilitating its use in waterless cooking.

A further object of the present invention is to provide a cookware utensil having a lid which can be used for straining liquid from the cooked food in the utensil.

An even still further object of the present invention is to provide a cookware utensil having a lid which includes various size strainer openings for use with different types of foods.

In accordance with the above objects, the device of the present invention comprises a pan having a generally cylindrical shape and an enclosed bottom. A spout is formed on the upper edge of the pan for pouring liquids therefrom. An offset rim is formed about the upper edge of the pan and provides a seat for receiving a generally radial flange extending about the edge of the pan cover. The radial flange is received in the seat and forms a generally watertight fit therein to enhance the ability of the pan to be used for waterless cooking. The lid also includes a generally depending annular flange which fits within the pan and rests flush against the inner surface thereof. The width of the depending flange is slightly greater than the depth of the pour spout so that the flange extends across the entire pour spout when the top is seated properly on the pan. At least one area of the depending flange is imperforate for a section sufficiently wide to cover the opening for the pour spout thus completely enclosing the interior of the pan. Another section of the depending flange contains a plurality of holes which can be disposed across the opening to the spout in order to drain liquid from finer foods. Another section of the depending flange contains slots which are relatively large and can be disposed across the opening for the spout in order to drain liquid from coarser foods.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the cookware with drainage lid of the present invention.

FIG. 2 is an elevational sectional view taken substantially along a plane passing through section line 2—2 of FIG. 1.

FIG. 3 is a perspective view of the lid showing holes formed in a section of the depending flange.

FIG. 4 is an elevational view of the lid showing the slots formed in the depending flange.

FIG. 5 is a plan view of the knob disposed on the lid showing the indicator markings.

DESCRIPTION OF THE PREFERRED EMBODIMENT

Now with reference to the drawings, a cookware utensil with a drainage lid incorporating the principles and concepts of the present invention and generally referred to by the reference numeral 10 will be described in detail.

Device 10 includes a sauce pan 12 which is adapted for use in waterless cooking by virtue of lid 14 which fits snugly on the sauce pan for inhibiting the release of water vapor therefrom. The tight fit of lid 14 on sauce pan 12 is produced partly by the seating of radial flange 16 formed about the outer periphery of the lid into seat 18 formed on the inner surface of offset lip 20 which extends about the upper free edge of the sauce pan. Accordingly, with radial flange 16 properly seated, the interior of the sauce pan 12 is closed off except for an opening leading to pour spout 22. This opening can also be closed off by disposing an imperforate portion of depending annular flange 30 across the opening to spout 22. Depending flange 30 is fixed integrally to the lid 14. Thus, the pan 12 and flange 30 are generally circular in plan and the flange 30 fits snugly within the pan and lies flush against the inner surface of the pan concentric with the pan to further enhance the seal between the lid and the pan. Since the lid does lie concentrically with the pan, it can easily be rotated from one orientation to another within the pan. Accordingly, if no venting of the pan interior is desired, the lid merely has to be rotated such that an imperforate area such as shown at 32 lies across the opening to spout 22. The width of flange 30 is such that the bottom edge of the flange 34 lies below the opening to spout 22 and the pan interior can thereby be easily closed off completely.

When it is desired to drain liquid from the cooked food in the pan, the lid is simply rotated until holes 36 lie across the opening to spout 22 or slots 38 lie across the spout. Obviously, either the holes or the slots can be used to vent the pan interior or strain liquid from foods to be held within the pan. The holes 36 are used to strain finer foods while the slots 38 would be used to strain coarser foods. Further perforations can be formed on different areas of the flange 30 to accommodate whatever foods are to be cooked within the pan. Also, an entirely open area can be formed in flange 30 to be able to pour liquid such as water from the pan in a completely uninhibited manner.

In order to readily inform the user of the location of the various areas of flange which can be disposed across spout 22, representations of the various perforations shown at 40 and 42 are imprinted on the top of lid knob 44 to represent holes 36 and slots 38, respectively. Consequently, any particular area of flange 30 which is desired to be disposed across the spout 22 can easily be located and moved into the desired disposition quickly and easily.

It should be noted that the utensil 10 can be made out of any suitable material, such as aluminum, stainless steel or copper. The handle 50 is attached to the pan 12 to facilitate carrying the utensil and straining liquid from the food cooked therein. Handle 50 can be disposed on either side of the pot with the orientation of the handle being determined by whether the person using the utensil is right handed or left handed.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a cooking pan having a bottom, an upstanding peripheral wall terminating in an upper edge, handle means on said wall to enable manipulation of the pan, said wall including a pouring spout incorporated into the upper portion of the wall with the lower end of the spout spaced above the bottom of the pan, a lid forming a closure for the pan, said lid including a depending flange telescopically received within the wall of the pan is close fitting relationship thereto to form a closure for the pouring spout, said lid also including handle means fixed to the upper surface thereof to enable manipulation thereof, that improvement comprising the flange having a bottom edge extending to a point below the bottom edge of the pouring spout, said flange also including an imperforate portion and oppositely disposed perforated portions with the perforations in one of the perforated portions including a plurality of small circular holes and the perforations in the other perforated portion including a plurality of larger slot-like openings to enable the pouring spout to be closed when an imperforate portion of the flange is aligned therewith and communicating the spout with the interior of the pan when one of the perforated portions is aligned with the spout, said handle means on the lid including oppositely disposed pictorial representations of the perforations in the flange, said representations being oriented on the lid handle means to the side thereof adjacent the perforations represented thereby enabling a user to angularly orient the lid to position either of the perforated portions or the imperforate portion is alignment with the pouring spout without actually observing the flange on the lid.

* * * * *